United States Patent [19]
Sakashita et al.

[11] Patent Number: 5,862,590
[45] Date of Patent: Jan. 26, 1999

[54] METHOD OF MANUFACTURING CATALYTIC CONVERTER FOR THE PURIFICATION OF EXHAUST GAS

[75] Inventors: Keiichi Sakashita; Yoshio Nishikawa, both of Ohgaki, Japan

[73] Assignee: Ibiden Co., Ltd., Ohgaki, Japan

[21] Appl. No.: 835,737

[22] Filed: Apr. 10, 1997

[30] Foreign Application Priority Data

May 29, 1996 [JP] Japan .................................. 8-134731

[51] Int. Cl.$^6$ .................................................. B23P 15/00
[52] U.S. Cl. ................................................ 29/890; 29/446
[58] Field of Search .................... 29/890, 428, 446; 422/168, 179, 181

[56] References Cited

U.S. PATENT DOCUMENTS

| | | |
|---|---|---|
| 4,093,423 | 6/1978 | Neumann . |
| 4,163,042 | 7/1979 | Lynch . |
| 5,329,698 | 7/1994 | Abbott ........................ 29/890 |
| 5,555,621 | 9/1996 | Tanabe et al. .............. 29/890 |
| 5,557,847 | 9/1996 | Koshiba et al. ............ 29/890 |

FOREIGN PATENT DOCUMENTS

| | | |
|---|---|---|
| A2 0-299626 | 1/1989 | European Pat. Off. . |
| A2 0-685636 | 12/1995 | European Pat. Off. . |
| A2 0-703354 | 3/1996 | European Pat. Off. . |
| A1 38-27863 | 2/1990 | Germany . |
| A 50-63549 | 5/1975 | Japan . |
| A 57-146954 | 9/1982 | Japan . |
| A 59-126023 | 7/1984 | Japan . |
| A 5-508897 | 12/1993 | Japan . |
| A 7-189677 | 7/1995 | Japan . |
| A 7-189678 | 7/1995 | Japan . |

*Primary Examiner*—Irene Cuda

[57] ABSTRACT

A catalytic converter for the purification of exhaust gas including a catalyst carrier, a heat-insulating seal layer and a cylindrical metal shell is manufactured by providing an assembly including the catalyst carrier, a crystalline alumina fiber mat as the heat-insulating seal layer and a sheet-shaped article and pressing the assembly into the metal shell through a funnel-shaped fixture to render a bulk density of the crystalline alumina fiber mat in use into 0.25–0.60 g/cm$^3$.

3 Claims, 4 Drawing Sheets

FIG_1
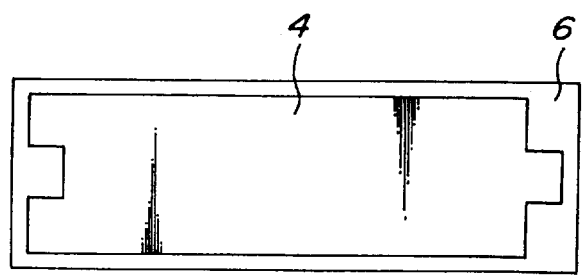
FIG_2
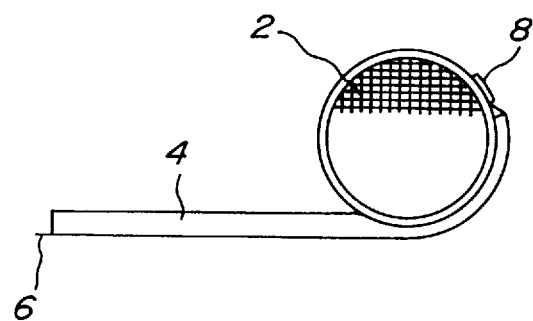

FIG._6
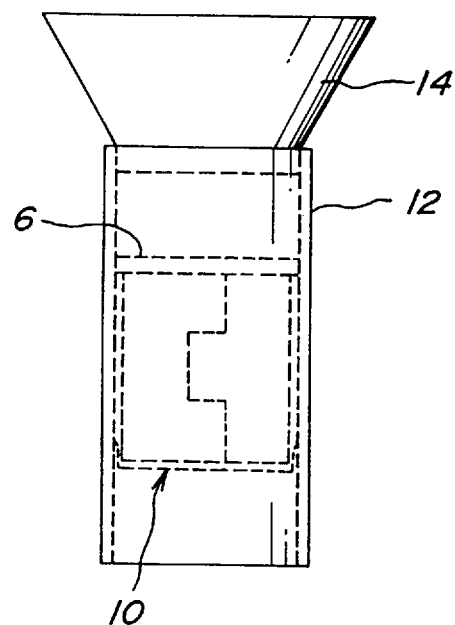
FIG._7
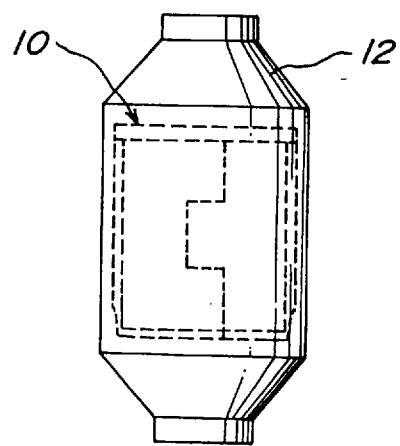

METHOD OF MANUFACTURING CATALYTIC CONVERTER FOR THE PURIFICATION OF EXHAUST GAS

BACKGROUND OF THE INVENTION

1. Field of the Invention

This invention relates to a method of manufacturing a catalytic converter for the purification of exhaust gas arranged in an exhaust system of an internal combustion engine, and more particularly to a method of manufacturing a catalytic converter arranged on the way of an exhaust pipe or an exhaust manifold in an exhaust system of a vehicle such as automobiles or the like to conduct the purification of exhaust gas.

2. Description of Related Art

In general, the catalytic converter for the purification of exhaust gas used in the exhaust system of the internal combustion engine comprises a catalyst carrier provided with a catalyst such as platinum or the like, a heat-insulating seal layer covering the outer surface of the catalyst carrier, and a metal shell housing an assembly of the carrier and the seal layer therein.

As the catalyst carrier in such a catalytic converter, there is used a monolithic carrier having a honeycomb shape at section and made from cordierite or the like.

As the heat-insulating seal layer, there is mainly used an inorganic fiber sheet. This sheet is used for holding the catalyst carrier at an adequate temperature to effectively develop the catalytic action and for preventing the damage of the catalyst carrier due to the contact with the outer metal shell during the running of the vehicle or the like, or preventing the leakage of exhaust gas from a space between the metal shell and the catalyst carrier.

As a method of manufacturing the catalytic converter, there has usually and widely been adopted so-called cram-shell system wherein the heat-insulating seal layer comprised of the inorganic fiber sheet is first wound around the catalyst carrier and then assembled into the metal shell by sandwiching between previously two divided parts of the shell. Recently, there is proposed a method wherein a cylindrical metal shell is used instead of the two-divided metal shell and the catalyst carrier covered with the heat-insulating seal layer is directly inserted into the cylindrical metal shell from a viewpoint of the improvement of operability and the like.

In order to closely fix the catalyst carrier to the inside of the metal shell through the heat-insulating seal layer when the catalyst carrier covered with the heat-insulating seal layer is directly inserted into the cylindrical metal shell, JP-A-7-189677 and JP-A-7-189678 propose a method of facilitating the assembling of the catalyst carrier to the metal shell wherein the catalyst carrier covered with the inorganic fiber sheet as the heat-insulating seal layer is placed in a bag of an airtight film and then the inside of the bag is evacuated to reduce the thickness of the inorganic fiber sheet, or JP-A-57-146954 and JP-A-59-126023 propose a method wherein the inorganic fiber sheet is closely sealed in an airtight film bag and then wound around the catalyst carrier.

As the inorganic fiber sheet, there has mainly been used an inorganic fiber sheet having an excellent handling property, which is comprised of a mixture of ceramic fibers and vermiculite being relatively poor in the heat resistance and having a high-temperature swelling property. Recently, the temperature of exhaust gas rises with the remarkable improvement of engine performances for automobiles and hence the inorganic fiber sheet used as the heat-insulating seal layer is required to have a higher heat resistance. For this end, it is now expected to use a sheet made of crystalline alumina fiber having an excellent heat resistance instead of the conventionally used inorganic fiber sheet made of the mixture of vermiculite and ceramic fibers.

However, the crystalline alumina fiber sheet is excellent in the heat resistance as compared with the inorganic fiber sheet made of the vermiculite and ceramic fiber mixture, but has drawbacks that it has not a high-temperature swelling property as in vermiculite and is relatively low in the fiber strength and the crystalline alumina fiber sheet is apt to broken under an influence of pulsation of the exhaust gas. Therefore, it is required to improve the sealing property by winding the crystalline alumina fiber sheet around the catalyst carrier at a state of increasing the bulk density of the sheet. In the conventional method of increasing the bulk density by reducing the thickness of the inorganic fiber sheet through the evacuation inside the airtight film bag, however, an external pressure is an atmospheric pressure and the bulk density can not sufficiently be increased and hence it is difficult to obtain the crystalline alumina fiber sheet at a state of increasing the bulk density by such a conventional method. Moreover, a method of closely fixing the catalyst carrier to the inside of the metal shell through a heat-insulating seal layer having a high compression restoring property is not known up to the present at all.

SUMMARY OF THE INVENTION

It is, therefore, an object of the invention to solve the above problems of the conventional technique and to provide a method of manufacturing a catalytic converter for the purification of exhaust gas by inserting the catalyst carrier into the cylindrical metal shell through the crystalline alumina fiber sheet as a heat-insulating seal layer.

According to the invention, there is the provision of a method of manufacturing a catalytic converter for the purification of exhaust gas comprising a catalyst carrier provided with a catalyst, a heat-insulating seal layer covering the outer surface of the catalyst carrier and a cylindrical metal shell housing the catalyst carrier and the heat-insulating seal layer therein, which comprises using a crystalline alumina fiber mat as a heat-insulating seal layer; providing an assembly comprising the catalyst carrier, the crystalline alumina fiber mat wound around the outer surface of the catalyst carrier and a sheet-shaped article covering the outer surface of the mat wherein at least a top portion of the sheet-shaped article to be inserted into the metal shell is fastened to the catalyst carrier; and pressing the assembly into the inside of the metal shell through a funnel-shaped fixture set on an entrance side of the metal shell to render a bulk density of the crystalline alumina fiber mat in use into 0.25–0.60 g/cm$^3$.

In preferable embodiments of the invention, a size of the mat is made smaller than an inner diameter of the metal shell by winding the sheet-shaped article, and the funnel-shaped fixture has a slit and an overlapping portion so as to change a circumferential length thereof.

DESCRIPTION OF THE PREFERRED EMBODIMENTS

The catalytic converter for the purification of exhaust gas according to the invention is an assembly comprising a catalyst carrier provided with a catalyst, a heat-insulating seal layer covering the outer surface of the catalyst carrier and a cylindrical metal shell housing the carrier and the seal layer therein.

As the catalyst carrier, there is a monolithic carrier provided with a catalyst such as conventionally used platinum or the like, having a honeycomb shape at section, and made from cordierite, alumina, chromium stainless steel or the like.

As the metal shell, there is used a metal cylinder having a sectional shape usually used such as a circle, an ellipse or the like and made from a heat-resistant stainless steel such as SUS409 or the like.

As the heat-insulating seal layer covering the outer surface of the catalyst carrier, there is used a crystalline alumina fiber mat absorbing a tolerance of an outer diameter of the catalyst carrier and having a given bulk density so as not to leak the exhaust gas in use after the assembling and an excellent heat resistance. This mat never causes the gas leakage due to the lowering of the swelling pressure as in the conventionally used seal layer and the degradation of the quality even when being particularly exposed to higher-temperature exhaust gas. Moreover, a resin may previously be added to the mat from a viewpoint of the operability because the alumina fiber is relatively low in the handling strength and is broken when an excessively physical force is applied thereto. As the resin use may be made of synthetic rubbers giving a flexibility such as NBR latex, SBR latex and the like; and phenolic resin and the like giving a shape retention after the impregnation. Such a resin is added by spraying method, dipping method or the like.

According to the manufacturing method of the invention, the outer surface of the catalyst carrier is firstly covered with the crystalline alumina fiber mat as a heat-insulating seal layer, and then the sheet-shaped article is wound around the outer surface of the mat to be inserted into the metal shell under tension to fasten at least a top portion thereof to the top portion of the mat, and thereafter the assembly comprised of the catalyst carrier, crystalline alumina fiber mat and sheet-shaped article is pressed into the cylindrical metal shell through the funnel-shaped fixture set on the entrance side of the shell. In this case, it is enough to cover at least a part of the outer surface in the longitudinal direction of the catalyst carrier (zone sufficient to hold the catalyst carrier in the metal shell) with the crystalline alumina fiber mat, and also it is sufficient that the opposed end portions of the mat are at least locally closed to each other.

As the material of the sheet-shaped article used in the invention, mention may be made of plastic films made from polyethylene, silicone resin, polyvinyl chloride, ionomer resin and the like; woven or unwoven fabrics of cotton, nylon, polyester and the like; papers such as kraft paper, paperboard and the like. In order to facilitate the insertion into the metal shell, it is particularly favorable to select a sheet-shaped article having a good surface smoothness or a low friction coefficient and producing no harmful gas by heat decomposition during the use of the converter. From this point, the use of polyethylene or ionomer resin is preferable. Moreover, the lubricity can be enhanced by applying a lubricant or the like to the outer surface of the sheet-shaped article or the inner surface of the metal shell. After the sheet-shaped article is wound around the outer surface of the crystalline alumina fiber mat under given tension, at least a top portion of the article is fixed to the top portion of the mat by adequate means. For example, a heat-shrinkable synthetic resin ring is fitted to the top portion of the sheet-shaped article, or a band-shaped ribbon or an adhesive tape is further wound around the top portion of the sheet-shaped article.

When the catalytic converter using such a sheet-shaped article is manufactured and incorporated into an exhaust system of an internal combustion engine to conduct a trial run, the sheet-shaped article is burnt by heat decomposition at a temperature of exhaust gas. The crystalline alumina fiber mat pressed into the metal shell has a bulk density of 0.25–0.60 g/cm$^3$, preferably 0.3–0.5 g/cm$^3$ in use. In general, the bulk density of the crystalline alumina fiber mat before the winding of the sheet-shaped article is 0.06–0.10 g/cm$^3$, so that the bulk density in use after the pressing into the metal shell can easily be obtained within the above defined range by restraining the crystalline alumina fiber mat in a thickness-reducing direction through the winding of the sheet-shaped article under a given tension. When the bulk density in use is less than 0.25 g/cm$^3$, it is difficult to closely hold the catalyst carrier in the metal shell through the crystalline alumina fiber mat and also the sealing property to the exhaust gas is poor, while when it exceeds 0.60 g/cm$^3$, it is difficult to press the assembly into the metal shell and also the crystalline alumina fibers constituting the mat are broken in the pressing.

The assembly comprised of the catalyst carrier, crystalline alumina fiber mat and sheet-shaped article is pressed into the metal shell by means of a pressing machine. In this case, the funnel-shaped fixture is previously set on an entrance side of the metal shell for facilitating the pressing of the assembly. This fixture has a slit and overlapping portions so as to change a circumferential length for absorbing a tolerance between the outer diameter of the assembly and the inner diameter of the metal shell. That is, since there are somewhat scatterings in the outer diameter of the assembly and the inner diameter of the metal shell, it is required that a tolerance of such scatterings can be absorbed by the funnel-shaped fixture. Further, burr and the like are usually existent on the end portion of the metal shell, so that if the assembly is directly pressed into the metal shell, the sheet-shaped article as an outermost layer of the assembly is broken by the burr and the like and hence the crystalline alumina fiber mat is exposed and swollen and destroyed before the pressing. In order to prevent this phenomenon, the top portion of the funnel-shaped fixture is previously and locally inserted into the metal shell. Moreover, when the assembly is pressed into the metal shell through such a fixture, it is favorable that a free end portion of the overlapped region appearing in the inside of the fixture is subjected to rounding for preventing the breakage of the sheet-shaped article.

As the top portion of the assembly is inserted into the metal shell through the fixture, the insertion of the remaining portion of the assembly becomes more easy because it is possible to reduce the total size of the catalyst carrier and crystalline alumina fiber mat constituting the assembly, particularly the size of the mat as the heat-insulating seal layer at the pressing step.

Moreover, the assembly may be placed in a bag of an airtight plastic film and then be presses into the metal shell in a pressurizing chamber of 2–10 kg/cm$^2$, preferably 4–7 kg/cm$^2$ by means of a pressing machine.

After the assembly is pressed into the metal shell, both ends of the metal shell are drawn by pressing, or a cone-shaped metallic pipe is welded to each end of the metal shell to manufacture a catalytic converter for the purification of exhaust gas. In this case, the slippage between the catalyst carrier and crystalline alumina fiber mat inside the metal shell is not caused in the pressing, so that there is caused no movement nor breakage of the catalyst carrier in the metal shell even in the handling and transportation of the resulting converter. Therefore, the method according to the invention can be applied to any structures of the converter without being affected by a clearance between the catalyst carrier and the metal shell. Furthermore, shearing force is not applied to the mat, so that the excellent shape retention of catalyst carrier and sealing property to exhaust gas can be maintained over a long period of time.

The catalytic converter for the purification of exhaust gas according to the invention is connected to an exhaust system of a vehicle in a factory for the manufacture of automobiles. Therefore, the sheet-shaped article covering the crystalline alumina fiber mat is burnt out by a higher temperature exhaust gas in trial run of the vehicle. Alternatively, the sheet-shaped article may previously be burnt out before the converter is connected to the exhaust system.

BRIEF DESCRIPTION OF THE DRAWINGS

The invention will be described with reference to the accompanying drawings, wherein:

FIG. 1 is a plan view illustrating a state of placing a crystalline alumina fiber mat on a sheet-shaped article;

FIG. 2 is a side view illustrating a state of winding an assembly shown in FIG. 1 around a catalyst carrier;

FIG. 6 is a front view illustrating a state of pressing an assembly comprised of the catalyst carrier, crystalline alumina fiber mat and sheet-shaped article into the metal shell;

FIG. 7 is a front view of a catalytic converter for the purification of exhaust gas worked at both end portions of the metal shell.

The following examples are given in illustration of the invention and are not intended as limitations thereof.

EXAMPLE 1

As shown in FIG. 1, a mat 4 of crystalline alumina fiber (trade name: Denkaarsen, made by Denki Kagaku Kogyo K.K.)having a thickness of 20 mm and a bulk density of 0.06 g/cm$^3$ is cut into dimensions of 100 mm in width, 420 mm in length and 25 mm in fitting portions formed on both ends, which is then placed on a polyethylene sheet 6 having a width of 200 mm, a length of 500 mm and a thickness of 50 μm.

Figure 3:
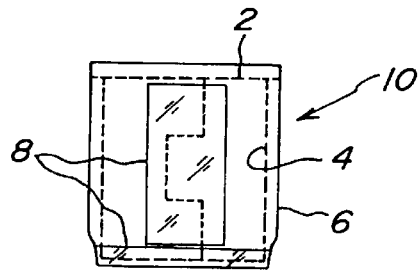
FIG. 3 is a front view illustrating a state of winding the crystalline alumina fiber mat and the sheet-shaped article around the catalyst carrier and further winding an adhesive tape around a top portion thereof for fixation.

As shown in FIG. 2, a monolithic catalyst carrier 2 of honeycomb structure made of cordierite and having an outer diameter of 130 mm and a length of 100 mm is placed on an end portion of the mat 4 and then an end portion of the sheet 6 is fastened to the catalyst carrier 2 through an adhesive tape 8, and thereafter the catalyst carrier 2 is rotated toward the other end portion of the mat 4 while pushing the carrier 2 to the mat 4, whereby the mat 4 and the sheet 6 are wound around the outer periphery of the catalyst carrier 2. After the fitting portions formed on both end portions of the mat 4 are fitted to each other, both end portions of the sheet 6 are fastened with an adhesive tape 8 to prepare an assembly 10 as shown in FIG. 3. After the winding, the mat 4 in the assembly 10 has a bulk density of 0.15 g/cm$^3$ and a thickness of 8 mm.

As shown in FIG. 3, another adhesive tape 8 is wound on at least top portion of the assembly to be inserted into a metal shell as mentioned below around the sheet 6, whereby the top portion of the crystalline alumina fiber mat 4 is somewhat reduced in size and fixed to the catalyst carrier 2 so as not to slip the mat 4 from the carrier 2.

Figure 4:
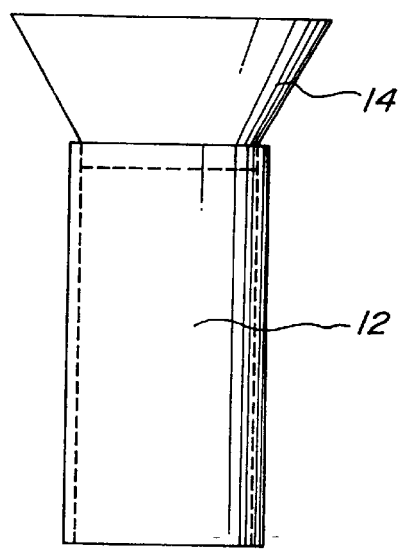
FIG. 4 is a front view illustrating a state of setting a funnel-shaped fixture on a metal shell.
Figure 5:
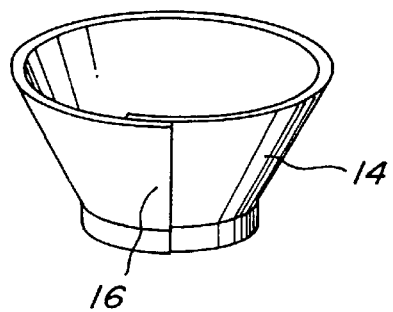
FIG. 5 is a perspective view of a funnel-shaped fixture.

On the other hand, there is provided a metal shell 12 of SUS 409 stainless steel pipe having an inner diameter of 138 mm, a thickness of 1.5 mm and a length of 300 mm as shown in FIG. 4, in which a funnel-shaped fixture 14 as shown in FIG. 5 is previously set on a top portion of the pipe at a side of inserting the assembly 10. The fixture 14 is made from a metal plate of 0.6 mm in thickness and has an overlapping portion of 30 mm so as to change such a circumferential length that an inner diameter at a large-size side is 160 mm, an outer diameter at a small-size side is 138 mm and a height is 50 mm.

The assembly 10 shown in FIG. 3 is inserted into the inside of the fixture 14 shown in FIG. 4 and then pressed into a middle of the pipe 12 under a press load of 250 kgf by means of a hydraulic press. Moreover, a lubricant is applied to inner surfaces of the fixture 14 and the pipe 12 and an outer surface of the sheet 6 before the pressing. A state after the pressing is shown in FIG. 6. In this case, the bulk density of the crystalline alumina fiber mat 4 after the pressing is 0.3 g/cm$^3$.

After the fixture 14 is taken out, both end portions of the pipe 12 are subjected to spinning work to manufacture a catalytic converter for the purification of exhaust gas as shown in FIG. 7.

COMPARATIVE EXAMPLE 1

The same procedure as in Example 1 is repeated except that the bulk density of the crystalline alumina fiber mat 4 after the winding of the sheet 6 and before the pressing is 0.08 g/cm$^3$. In this case, the thickness of the mat 4 before the pressing is 15 mm, while the clearance between the catalyst carrier 2 and the pipe 12 is 4 mm, so that when the assembled state of the mat is investigated after the pressing, the read end portions of the mat with respect to the insertion direction is too biased and also the alumina fibers constituting the mat are broken.

COMPARATIVE EXAMPLE 2

The same procedure as in Example 1 is repeated except that the end portion of the sheet 6 inserted is not fixed by the adhesive tape 8. In this case, the end portion of the crystalline alumina fiber mat inserted is torn off and the assembly 10 can not be pressed into the pipe 12. COMPARATIVE EXAMPLE 3

The same procedure as in Example 1 is repeated except that the assembly 10 is pressed into the pipe 12 without using the funnel-shaped fixture shown in FIG. 5. In this case, the end portion of the crystalline alumina fiber mat inserted is torn off and the assembly 10 can not be pressed into the pipe 12 likewise Comparative Example 2.

EXAMPLE 2

The same procedure as in Example 1 is repeated except that the sheet 6 is wound around a crystalline alumina fiber mat 4 having a thickness of 12 mm and a bulk density of 0.1 g/cm$^3$ so as to provide a thickness of 5 mm and a bulk density of 0.24 g/cm$^3$ after the winding and the press load is 200 kgf, whereby a catalytic converter for the purification of exhaust gas as shown in FIG. 7 is obtained. In this case, the bulk density of the crystalline alumina fiber mat after the pressing is 0.3 g/cm$^3$.

EXAMPLE 3

As shown in FIG. 2, a crystalline alumina fiber mat 4 having a width of 100 mm, a length of 415 mm, a thickness of 20 mm and a bulk density of 0.10 g/cm³ is wound as a heat-insulating seal layer around a cylindrical catalyst carrier 2 of cordierite having an outer diameter of 130 mm, and further a polyethylene sheet 6 having a thickness of 50 μm is wound therearound and both end portions of the sheet are airtightly closed to prepare an assembly 10. In this case, the mat 4 has a bulk density of 0.25 g/cm³ and a thickness of 8 mm.

Figure 8:
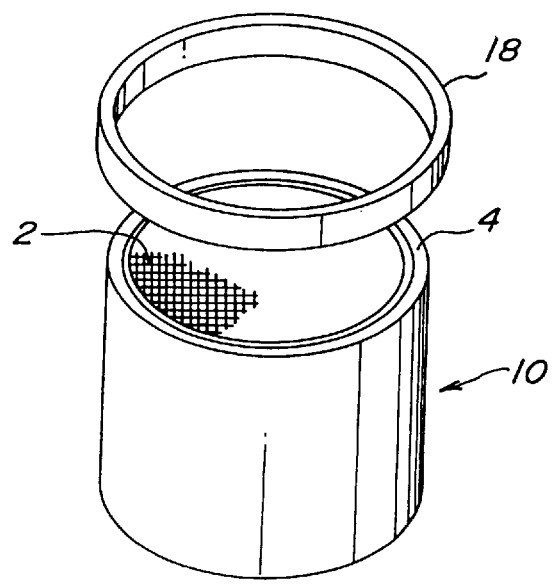
FIGS. 8 and 9 are schematic views showing production steps of another assembly, respectively.
Figure 9:
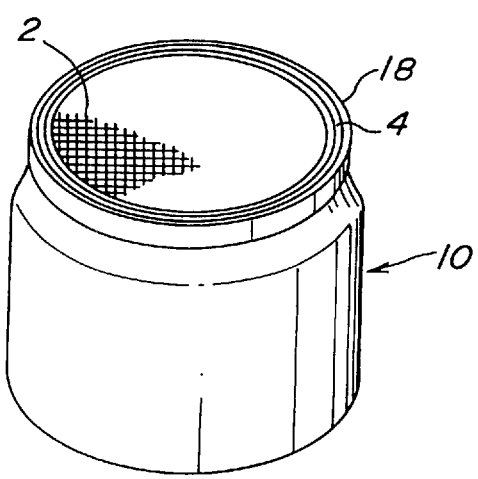

As shown in FIG. 8, a ring 8 of a heat-shrinkable polyvinyl chloride having an inner diameter slightly larger than an outer diameter of the assembly 10 is fitted to a top portion of the assembly 10 to be inserted, which is placed in a pressurizing chamber and heated to a temperature (120° C.) lower than a softening temperature of the sheet 6 to heat-shrink the ring 18 as shown in FIG. 9. As a result, the top portion of the mat has a bulk density of 0.36 g/cm³ and a thickness of 5.5 mm.

Then, the thus treated assembly 10 is pressed into a metal pipe 12 having an inner diameter of 142 mm through a funnel-shaped fixture 14 under a pressure of 4 kgf/cm² in the pressurizing chamber as shown in FIG. 4. Since the clearance between the catalyst carrier 2 and the metal pipe 12 is 6 mm, the mat 4 in the assembly 10 is equally filled in the pipe 12 without damaging the mat 4.

After the fixture 14 is taken out, both end portions of the pipe 12 are subjected to spinning work to manufacture a catalytic converter for the purification of exhaust gas as shown in FIG. 7.

EXAMPLE 4

The same procedure as in Example 3 is repeated except that the same adhesive tape 8 as in Example 1 is wound around the top portion of the mat 4 instead of the heat-shrinkable ring 18, whereby a catalytic converter for the purification of exhaust gas as shown in FIG. 7 is manufactured. In this case, the bulk density of the crystalline alumina fiber mat 4 is 0.4 g/cm³.

As mentioned above according to the invention, the catalyst carrier can be pressed into the metal shell without the damage of the heat-insulating seal layer covering the outer surface of the carrier, so that the catalytic converter can cheaply be manufactured in a high yield. Furthermore, the assembly comprised of the catalyst carrier, crystalline alumina fiber mat and sheet-shaped article can surely be guided into the metal shell, so that the slippage between the mat and the catalyst carrier is not caused inside the metal shell in the pressing and also there is caused no movement nor breakage of the catalyst carrier in the metal shell even in the handling and transportation of the resulting converter. Therefore, the method according to the invention can be applied to any structures of the converter without being affected by a clearance between the catalyst carrier and the metal shell.

What is claimed is:

1. A method of manufacturing a catalytic converter for the purification of exhaust gas comprising a catalyst carrier provided with a catalyst, a heat-insulating seal layer covering the outer surface of the catalyst carrier and a cylindrical metal shell housing the catalyst carrier and the heat-insulating seal layer therein, which comprises using a crystalline alumina fiber mat as a heat-insulating seal layer; providing an assembly comprising the catalyst carrier, the crystalline alumina fiber mat wound around the outer surface of the catalyst carrier and a sheet-shaped article covering the outer surface of the mat wherein at least a top portion of the sheet-shaped article to be inserted into the metal shell is fastened to the catalyst carrier; and pressing the assembly into the inside of the metal shell through a funnel-shaped fixture set on an entrance side of the metal shell to render a bulk density of the crystalline alumina fiber mat in use into 0.25–0.60 g/cm³.

2. The method according to claim 1, wherein a size of the mat is made smaller than an inner diameter of the metal shell by winding the sheet-shaped article.

3. The method according to claim 1, wherein the funnel-shaped fixture has a slit and an overlapping portion so as to change a circumferential length thereof.

\* \* \* \* \*

UNITED STATES PATENT AND TRADEMARK OFFICE
CERTIFICATE OF CORRECTION

PATENT NO. : 5,862,590
DATED : January 26, 1999
INVENTOR(S) : Keiichi SAKASHITA and Yoshio NISHIKAWA It is certified that error appears in the above-identified patent and that said Letters Patent is hereby corrected as shown below:

On the title page, change "[54] METHOD OF MANUFACTURING CATALYTIC CONVERTER FOR THE PURIFICATION OF EXHAUST GAS" to --METHOD OF MANUFACTURING A CATALYTIC CONVERTER FOR THE PURIFICATION OF EXHAUST GAS--

Signed and Sealed this

Sixth Day of July, 1999

Attest:

Q. TODD DICKINSON

*Attesting Officer*        *Acting Commissioner of Patents and Trademarks*